United States Patent [19]

Clabburn et al.

[11] 4,233,731
[45] Nov. 18, 1980

[54] RESILIENT CONNECTOR

[75] Inventors: Robin J. T. Clabburn, Swindon; Richard J. Penneck, Lechlade, both of England

[73] Assignee: Raychem Limited, London, England

[21] Appl. No.: 870,184

[22] Filed: Jan. 17, 1978

[30] Foreign Application Priority Data

Jan. 24, 1977 [GB] United Kingdom ................ 2832/77

[51] Int. Cl.³ ...................... H01R 43/00; H02G 15/08
[52] U.S. Cl. ........................................ 29/859; 29/863; 29/882; 156/85; 156/86; 174/35 C; 174/84 R; 174/DIG. 8; 228/245; 228/904; 339/275 R; 339/DIG. 1; 428/36; 428/161; 428/163; 428/913; 339/275 B
[58] Field of Search ...................... 29/628; 156/85, 86; 403/28, 272, 273; 174/35 C, 84 R, DIG. 8; 428/36, 161, 163, 913; 228/135, 132, 128, 56, 245, 904; 339/275 R, 275 B, DIG. 1

[56] References Cited

U.S. PATENT DOCUMENTS

| 2,258,836 | 10/1941 | Willner | 250/27.5 |
|---|---|---|---|
| 2,972,657 | 2/1961 | Stemke | 339/27.5 |
| 3,234,630 | 2/1966 | Kenyon | 29/155.5 |
| 3,243,211 | 3/1966 | Wetmore | 29/630 F |
| 3,247,315 | 4/1966 | Miller | 403/193 |
| 3,273,226 | 9/1966 | Brous | 29/155.5 |
| 3,316,343 | 4/1967 | Sherlock | 403/273 |
| 3,525,799 | 8/1970 | Ellis | 29/628 |
| 3,541,495 | 11/1970 | Ellis | 339/275 T |
| 3,616,532 | 2/1971 | Beck | 29/625 |
| 3,913,444 | 10/1975 | Otte | 174/DIG. 8 |
| 4,016,356 | 5/1977 | McLoughlin | 174/35 R |

FOREIGN PATENT DOCUMENTS

| 493677 | 10/1938 | United Kingdom . |
|---|---|---|
| 1062870 | 3/1967 | United Kingdom . |
| 1098304 | 1/1968 | United Kingdom . |
| 1327441 | 8/1973 | United Kingdom . |
| 1327442 | 8/1973 | United Kingdom . |
| 1403175 | 8/1975 | United Kingdom . |
| 1428134 | 3/1976 | United Kingdom . |
| 1439848 | 6/1976 | United Kingdom . |

Primary Examiner—Francis S. Husar
Assistant Examiner—Gene P. Crosby
Attorney, Agent, or Firm—Lyon & Lyon

[57] ABSTRACT

A dimensionally-recoverable article comprising a hollow resilient member which has been expanded to a dimensionally unstable configuration in which it is retained by a keeper positioned between and separating two parts of the hollow member away from the path of recovery thereof. The keeper is preferably made from a fusible or chemically degradable material so that it can be removed, for example, by heating or chemical treatment to allow the hollow member to recover towards its original configuration. One preferred form of article is a radially-expanded longitudinally split tube having the keeper positioned within the split. Such an article may be used as a connector to secure an earth lead to the sheath of a mineral-insulated cable.

19 Claims, 8 Drawing Figures

RESILIENT CONNECTOR

This invention relates to recoverable articles, especially heat-recoverable articles and is more particularly concerned with articles suitable for connecting substrates to form, for example, an electrical connection.

Many attempts have been made to provide connectors for substrates such as, for example, electrical conductors, which do not require crimping or other mechanical deformation of the conductors. For example, in U.S. Pat. No. 3,247,315 there is described a connector which comprises a tubular member capable of constricting about itself, which consists of a piece of resilient sheet material which has been rolled to a tubular shape. In one embodiment the tubular member is retained in a radially expanded condition by means of an internal tube or plug of solder. In use, the connector is positioned about a pair of wires and heated so that the solder melts and the tubular member constricts about itself, thereby gripping and holding the electrical conductors. This arrangement suffers from the disadvantage that the internal diameter of the tubular member is reduced by the presence of the solder tube or plug, and thus the tubular member is required to have a relatively large degree of resilient recovery to compensate for the thickness of the solder tube or plug.

British Pat. No. 1,062,870 describes a heat-recoverable article in which the recoverable component is a resilient member in tubular form, the tube being circumferentially interrupted to permit changes in the radius thereof, and being retained in an expanded configuration by a fusible member which is positioned at least partly in the path of recovery of the recoverable member. When the fusible member is raised to a temperature at which it is insufficiently rigid to retain the resilient member in its expanded form, the recoverable member contracts and thereby urges at least some of the material of the fusible member in the direction of recovery. Such an article also requires a relatively large degree of recovery on the part of the resilient member to compensate for the thickness of the fusible member.

In forming terminations and splices in mineral insulated electric cables, it is desirable, and is becoming increasingly necessary in order to conform with official regulations, to provide an earth connection to the sheath of the cable. Mineral insulated electric cables consist of one or more conductors surrounded by a sheath, usually of copper or aluminium, and having insulation material comprising a powdered mineral, for example magnesium oxide. The terminations and splices are usually covered by a sleeve of heat-recoverable material to exclude moisture from the insulation material, for example as described in British Pat. No. 1,098,304. It has been proposed in British Pat. No. 1,428,134 to provide a device for both sealing and effecting an earth connection for a cut back end of a mineral insulated cable in which the earth connector is urged into contact with the copper sheath of the cable by means of the heat-recoverable plastics sleeve. However such a connection is mechanically weak because the only force tending to retain the connector in contact with the sheath is the recovery force of the heat-recoverable sleeve. There is thus a need for an earth connector for a mineral insulated cable which does not require crimping (which might damage the insulation of the cable), which provides a strong mechanical contact with the sheath together with a low contact resistance, and which is small enough to be contained within the heat-recoverable sleeve used in terminating or splicing the cable.

According to the present invention there is provided a hollow recoverable article comprising a hollow resiliently recoverable member which has been expanded from an original configuration to a dimensionally unstable configuration and which is retained in the expanded configuration by a material which weakens or changes shape upon heating or chemical treatment, e.g. with a solvent, the material being positioned substantially out of the path of recovery of the hollow member.

In one aspect of the present invention there is provided a hollow recoverable article comprising a hollow resiliently recoverable member of discontinuous cross-section which has been expanded in the plane of this cross-section from an original configuration, and which is retained in the expanded configuration by a material which weakens or which changes shape upon heating or chemical treatment, e.g. with a solvent, positioned within the discontinuity, the arrangement being such that when the material is heated or chemically treated it weakens or changes shape so that it becomes insufficiently strong to retain the hollow resiliently recoverable member in its expanded configuration.

In general, it is preferred to apply heat to the material to cause it to soften and melt or change shape, but in some instances chemical treatment may be appropriate, for example a volatile organic solvent such as acetone may be applied to the body to cause it to weaken or change shape by, for example, dissolution or leaching out of a dissolvable material. For convenience, however, the invention will be further described hereinafter with reference to materials which weaken or change shape on heating although it will be understood that the present invention is not limited thereto.

By "resiliently recoverable" there is meant that ability of the member to return elastically from a dimensionally unstable configuration to an original configuration even at ambient temperature on the release or removal of a restraining force or body tending to oppose the elastic return.

The invention further provides a method for connecting substrates, and in particular electrical conductors, in which there is used a recoverable article according to the invention.

Preferably the hollow recoverable article has a continuous cross-section, and for example when there is used a hollow resiliently recoverable member having a discontinuous cross-section, the material which weakens or changes shape upon the application of heat will preferably entirely fill the discontinuity so as to produce an article having a continuous cross-section.

The hollow recoverable member is preferably of generally tubular shape, having a break or circumferential discontinuity permitting radial expansion and contraction. In an especially preferred embodiment the tubular member has, parallel to its longitudinal axis, a longitudinal slit in its circumference, for example the tubular member may comprise a circumferentially interrupted cylinder. In this preferred embodiment the material which weakens or which changes shape upon heating may be interposed between the circumferentially adjacent edges of the cylinder so as to form part of the circumference of the tubular member.

When the keeper is positioned within a discontinuity in the resilient member, the keeper, the resilient member or both are preferably profiled so that they co-operate to retain the keeper within the discontinuity.

In one simple form the opposing edges of the resilient member in the vicinity of the discontinuity may be machined so that they lie in a truly parallel relationship in the expanded configuration. In this way there is no danger that the keeper will be squeezed out by a wedge-like action.

However, in preferred embodiments, the keeper, the resilient member or both are profiled so as positively to retain the keeper in position.

For example, the edges of the resilient member may be machined with concave grooves and the keeper may be a rod or a tube. Alternatively, the keeper may be provided with concave grooves and the edges may be machined to the appropriate convex curvature. In another arrangement of this type, the grooves may be U-shaped or V-shaped and the edges of the resilient member or the keeper are shaped so as to fit within them.

In one especially preferred embodiment the edges of the resilient member are machined to have sloping surfaces and the keeper is dovetailed in cross-section, the sloping sides of the dovetail abutting the sloping surfaces of the edges. At the narrower end of the dovetail flanges are provided which fit around the edges of the resilient member of either the inside or outside surface thereof.

In these and other embodiments it is not essential for the whole keeper to be disburdenable, it may be sufficient in many cases for only a portion thereof to be removable or changeable to allow recovery.

The hollow member is formed from a material which is resiliently recoverable, and for example it may be formed from a metal such as, for example beryllium-copper, steel or aluminium which has been heat treated to render it resilient. Preferably the metal is a good electrical conductor and for example excellent results have been obtained with beryllium-copper.

Although less preferred in most instances, the hollow member may also be formed from an elastomeric polymeric material, especially a synthetic or natural rubber which is sufficiently rigid to be held in the expanded configuration at ambient temperature by the body. Other suitable polymeric materials include the so-called "engineering plastics" such as polyarylenes and polysulphones.

The material which weakens or changes shape upon the application of heat serves to restrain the forces in the hollow member which tend to return it to its stable configuration. Thus if the hollow member is expanded, for example on a mandrel, and a block or wedge of the material is interposed in the circumference of the hollow member before removal of the mandrel, then resilient recovery of the hollow member may be restrained by the body. When the heat-recoverable article thus formed is heated to weaken the material, or cause it to change shape, the hollow member will be allowed to recover towards its original configuration.

The material used to hold the hollow member in a radially expanded state may be fusible, heat-softenable or pyrolysable. Especially suitable fusible and heat-softenable materials are thermoplastic polymers, e.g. such as homopolymers and copolymers, derived for example, from olefin monomers, e.g. ethylene, propylene, butene and styrene, unsaturated esters, e.g. vinyl acetate, ethyl acrylate and methyl methacrylate and other unsaturated monomers such as acrylonitrile. Other suitable polymeric materials are Delryn, nylons and polysulphones. Certain low-melting metal alloys, e.g. lead-tin alloys, may also be used.

Amongst suitable pyrolysable materials there may be mentioned certain thermosetting polymers such as bakelite and urea-formaldehyde resins.

Of those materials which change shape on heating there may especially be mentioned heat-recoverable polymeric material such as those described in U.S. Pat. Nos. 2,027,962 and 3,086,242. Heat-recoverable metals may also be employed in certain applications, including, for example, the nickel-titanium alloys described in NASA publication SP5 110, "55-Nitinol-The Alloy with a Memory etc." (U.S. Government Printing Office, Washington D.C. 1972); the $\beta$-brass alloys described in, for example, N. Nakanishi et al, *Scripta Metallurgica* 5, 433–440 (Pergamon Press 1971); and the stainless steels described in, for example, E. Enami et al, id at pages 663–668.

In some cases the use of chemically degradable keepers may be appropriate. For example, a volatile organic solvent such as acetone may be applied to the keeper to cause it to weaken or change shape by, for example, dissolution or leaching out of a dissolvable component of the keeper material. In other applications the keeper may advantageously be made from a material, such as a polycarbonate which undergoes stress cracking when treated with a solvent.

The invention is particularly useful in the production of connectors for connecting substrates such as, for example, electrical conductors, and will subsequently be more particularly described with reference thereto. It is to be understood however that the invention may have many other applications as will be apparent to those skilled in the art.

In a particularly preferred embodiment according to the invention the heat-recoverable article is positioned within a heat-recoverable sleeve so that on recovery the sleeve provides an environmental seal for the connection made by the article. In terminations and splices for mineral insulated cables the heat-recoverable sleeve is preferably provided with a fusible insert as described in British Pat. No. 1,098,304. Such an arrangement provides a single heat-recoverable part which in one operation is capable of providing an earth connection and a seal for the mineral insulated cable termination or splice. Preferably, the temperature at which the material becomes insufficiently strong to retain the resilient hollow member in its expanded state is preferably lower than the temperature of recovery of the heat-recoverable sleeve and the temperature of fusion of the fusible insert.

The invention will now be described in more detail, by way of example only, with reference to the accompanying drawings, in which.

Figure 1:
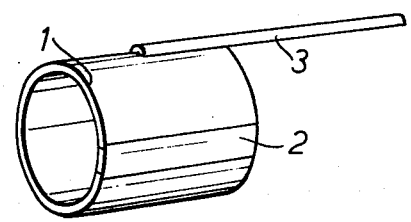
FIG. 1 shows a perspective view of an embodiment of a connector according to the invention in its heat-recoverable state.

Referring now to FIG. 1 the connector comprises a split cylindrical hollow tube 1, formed from beryllium-copper alloy, which is held in a radially expanded state by a wedge of fusible material 2 interposed in the break in the circumference of the split tube 1. The fusible material may for example be polystyrene. An earth lead 3 is connected to the split tube by any suitable means, for example soldering. It can be seen that, because the fusible material is not positioned inside the split tube, the whole of the resilient recovery of the split tube is available for making a firm mechanical connection with an electrical conductor passing therethrough.

Figure 2:
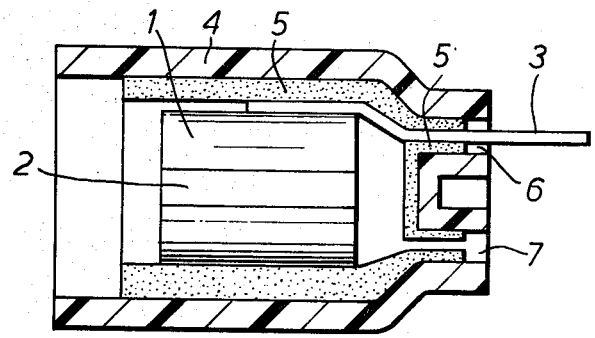
FIG. 2 shows a side elevation partly in section of the connector of FIG. 1 positioned within a heat-recoverable sleeve provided with a fusible insert.

Referring now to FIG. 2, there is shown a heat-recoverable sleeve 4 having positioned therein a fusible insert 5, the sleeve and the insert being provided with passages 6 and 7 for receiving conductors from the termination. For convenience only two of these are shown, though it is to be understood that in practice there may be as many as five. Positioned within the fusible insert 5 is the split tube 1, held in a radially expanded state by the fusible wedge 2, and having its earth lead 3 passing out of the sleeve via the passage 6.

Figure 3:
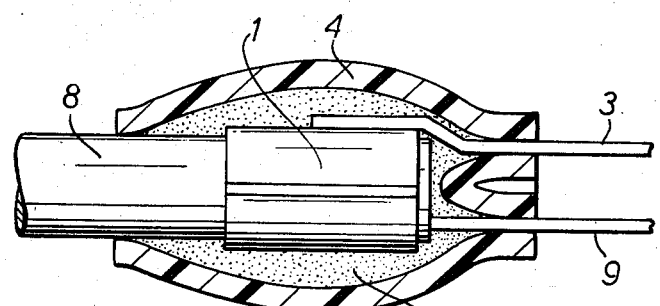
FIG. 3 shows a side elevation partly in section of the sleeve and the connector recovered about a termination of a mineral insulated cable.

FIG. 3 shows the assembly of FIG. 2 recovered about a termination of a mineral insulated cable 8. The cable has a conductor 9 which passes out of the termination via the passage 7. It can be seen that the split tube 1 has recovered into tight gripping engagement with the copper sheath of the mineral insulated cable and that the fusible insert 5 has flowed so as completely to encase the termination forming a moisture proof seal. The use of the assembly of FIG. 2 to provide an earth connection and a moisture proof seal for a mineral insulated cable termination is achieved in a very simple fashion. The assembly is simply positioned over the termination, making sure that the conductor or conductors of the mineral insulated cable pass through their respective passageways in the assembly, and the assembly is then heated, for example by hot air or other suitable means, in order to cause recovery of the split tube, flowing of the fusible insert, and recovery of the heat-recoverable sleeve.

Figure 4:
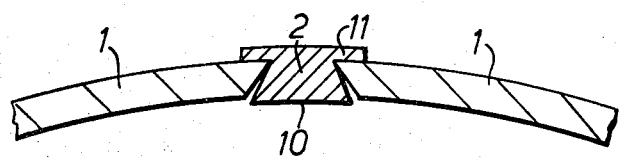
FIG. 4 shows, in cross-section, the arrangement, prior to recovery, of the keeper 2 and the edges of the tube 1 of the connector of FIGS. 1 to 3.

FIG. 4 shows how the keeper 2 and the opposing edges of the split tube 1 may be shaped to retain the keeper in position prior to recovery. In this preferred embodiment the keeper 2 has a dovetailed portion 10 adapted to cooperate with the machined edges and a flanged portion 11 which lies above these edges on the outer surface of the tube. Only the dovetailed portion 10 need be fusible.

Figure 5:
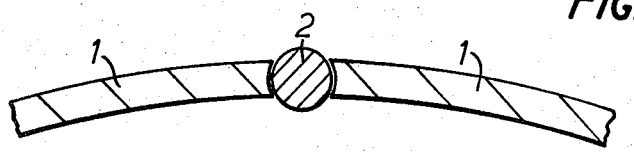
FIG. 5 shows, in cross-section, a second form of suitable arrangement.
Figure 6:
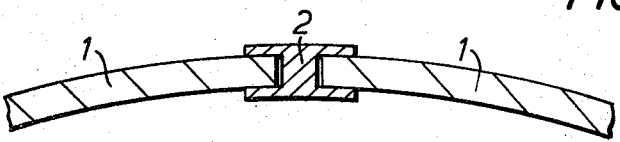
FIG. 6 shows, in cross-section, a third form of suitable arrangement.
Figure 7:
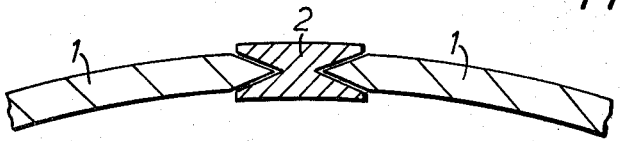
FIG. 7 shows, in cross-section, a fourth form of suitable arrangement.

FIGS. 5 to 7 show other suitable keeper/edge profiles.

Figure 8:
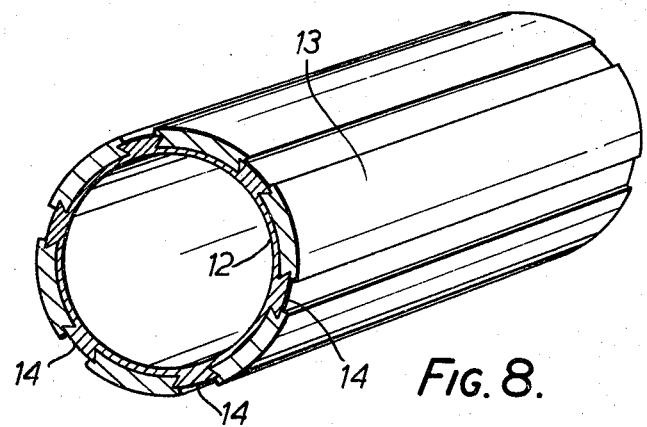
FIG. 8 shows a further form of recoverable article.

In FIG. 8, there is shown a further form of connector in accordance with the present invention. In this embodiment, the dimensionally resilient recoverable tubular member 12 is of continuous cross-section and is made from an engineering plastics material such as a polysulphone. It is held in the expanded configuration by strips 13 of a polycarbonate which strips are positioned between dovetailed protruberances 14. As shown, the strips 13 conform to the sloping surfaces of the protruberances 14 and overlap the upper surfaces thereof as protection against becoming accidentally dislodged.

It will be appreciated that the retaining material may be such that it both weakens and changes shape on heating and/or chemical treatment. It will also be appreciated that two or more members of retaining material may be employed.

Reference is made to Patent Application Ser. No. 870,185 filed today by M. D. Gazeley claiming priority from British Application No. 8408/77 filed Feb. 28, 1977, which describes and claims recoverable connectors in which the keeper and/or the recoverable component are profiled to retain the keeper in position in a discontinuity in the recoverable component.

Reference is also made to Patent Application Ser. No. 870,183 filed today by the present inventors claiming priority from British Patent Application No. 2833/77 filed Jan. 24, 1977 which describes and claims recoverable articles in which the recoverable member exhibits both thermal and resilient recovery.

Other variations and modifications falling within the scope of the present invention will be apparent to those skilled in the art, for example in certain instances the keeper may be one that can be mechanically weakened or deformed to allow recovery.

We claim:

1. A dimensionally resiliently recoverable article which comprises a hollow, dimensionally, resiliently recoverable member which has been elastically expanded from an original configuration to a dimensionally unstable, expanded configuration, wherein the hollow member has protruberances on its outer surface, said hollow member being retained in the elastically expanded configuration by a keeper material which is different from the hollow member and which is positioned between said protruberances, wherein upon chemical treatment of the keeper material, it can no longer retain the hollow member in the expanded configuration and the hollow member resiliently recovers.

2. The article of claim 1 wherein the resiliently recoverable member is of continuous cross-section.

3. The article of claim 2 in which the resiliently recoverable member is made from a polysulphone.

4. The article of claim 2 in which the protruberances are dovetailed.

5. The article of claim 4 in which the keeper material comprises strips positioned between said protruberances, the strips conforming to sloping surfaces of the protruberances and overlapping the upper surfaces thereof.

6. The article of claim 5 in which the strips are made from a polycarbonate.

7. A dimensionally resiliently recoverable article which comprises a hollow, dimensionally, resiliently recoverable member which has been elastically expanded from an original configuration to a dimensionally unstable, expanded configuration, wherein the hollow member has protruberances on its outer surface, said hollow member being retained in the elastically expanded configuration by a keeper material which is different from the hollow member and which is positioned between said protruberances, wherein upon heating of the keeper material, it can no longer retain the hollow member in the expanded configuration and the hollow member resiliently recovers.

8. The article of claim 7 wherein the resiliently recoverable member is of continuous cross-section.

9. The article of claim 8 in which the protruberances are dovetailed.

10. The article of claim 9 in which the keeper material comprises strips positioned between said protruberances, the strips conforming to sloping surfaces of the protruberances and overlapping the upper surfaces thereof.

11. A dimensionally, resiliently recoverable article which comprises a hollow, dimensionally, resiliently recoverable member of continuous cross section which has been elastically expanded from an original configuration to a dimensionally unstable, expanded configuration, wherein the hollow member has dovetailed protruberances on its outer surface, said hollow member being retained in the elastically expanded configuration by strips of a keeper material which is positioned between said protruberances, the strips being made of a polycarbonate and conforming to the sloping surfaces of the protruberances and overlapping the upper surfaces thereof, wherein upon chemical treatment said strips can no longer retain the hollow member in the expanded configuration and the hollow member resiliently recovers.

12. A method of making a dimensionally, resiliently recoverable article comprising the steps of elastically expanding a hollow resilient member of continuous cross-section from an original configuration to a dimensionally unstable, resiliently recoverable configuration, the unstable configuration including spaced apart protruberances on the outer surface of the hollow resilient member, and then retaining the hollow member in the unstable configuration by positioning between said protruberances a keeper material which is different from the hollow resilient member and which upon heating can no longer retain the hollow member in the unstable configuration so that the hollow member can resiliently recover.

13. A method of making a dimensionally, resiliently recoverable article comprising the steps of elastically expanding a hollow resilient member of continuous cross-section from an original configuration to a dimensionally unstable, resiliently recoverable configuration, the unstable configuration including spaced apart protruberances on the outer surface of the hollow resilient member, and then retaining the hollow member in the unstable configuration by positioning between said protruberances a keeper material which is different from the hollow resilient member and which upon chemical treatment can no longer retain the hollow member in the unstable configuration so that the hollow member can resiliently recover.

14. A method of making a connection to at least one substrate comprising the steps of (a) positioning the substrate inside a dimensionally, resiliently recoverable article which comprises a hollow resiliently recoverable member of continuous cross-section which has been expanded from an original configuration to a dimensionally unstable, resiliently recoverable configuration, wherein the hollow member has protruberances on its outer surfaces, the hollow member being retained in the expanded condition by a keeper material which is different from the recoverable member and which is positioned between said protruberances, whereupon heating the keeper material can no longer retain the hollow member in the expanded configuration, and (b) heating the keeper material to cause it to allow the hollow member to resiliently recover and grip the substrate.

15. A method of making a connection to at least one substrate comprising the steps of (a) positioning the substrate inside a dimensionally, resiliently recoverable article which comprises a hollow resiliently recoverable member of continuous cross-section which has been expanded from an original configuration to a dimensionally unstable, resiliently recoverable configuration, wherein the hollow member has protruberances on its outer surfaces, the hollow member being retained in the expanded condition by a keeper material which is different from the recoverable member and which is positioned between said protruberances, whereupon chemical treatment the keeper material can no longer retain the hollow member in the expanded configuration, and (b) chemically treating the keeper material to cause it to allow the hollow member to resiliently recover and grip the substrate.

16. A method of forming an earth connection to an end of a mineral-insulated cable, comprising:
  (a) placing about said cable end a resiliently recoverable connector which comprises:
    (i) a longitudinally slit tubular metal member, which has been elastically radially expanded,
    (ii) a thermoplastic polymeric keeper placed within the slit to hold said member in its expanded state, the keeper material being positioned substantially out of the path of radial recovery of said member, and
    (iii) an earth lead connected to said member; and
  (b) heating said keeper so that it weakens to permit said member to resiliently radially recover into tight gripping engagement about said cable end.

17. The method of claim 16, wherein the connection formed is insulated by a heat-recoverable plastic sleeve.

18. A method of forming an earth connection to an end of a mineral-insulated cable, comprising:
  (a) placing about said cable end a resiliently recoverable connector which comprises:
    (i) a longitudinally slit tubular metal member, which has been elastically radially expanded,
    (ii) a keeper, made from a material which weakens on chemical treatment, placed within the slit to hold said member in its expanded state, the keeper material being positioned substantially out of the path of radial recovery of said member, and
    (iii) an earth lead connected to said member; and
  (b) chemically treating said keeper so that it weakens to permit said member to resiliently radially recover into tight gripping engagement about said cable end.

19. The method of claim 18, wherein the connection formed is insulated by a heat-recoverable plastic sleeve.

* * * * *